(12) United States Patent
Ballard et al.

(10) Patent No.: US 9,212,608 B2
(45) Date of Patent: Dec. 15, 2015

(54) LOW FRICTION FUEL METERING VALVE

(71) Applicant: Hamilton Sundstrand Corporation, Windsor Locks, CT (US)

(72) Inventors: Peter M Ballard, Enfield, CT (US); Thomas James Killen, Wallingford, CT (US); Todd Haugsjaahabink, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 455 days.

(21) Appl. No.: 13/902,104

(22) Filed: May 24, 2013

(65) Prior Publication Data

US 2014/0345694 A1    Nov. 27, 2014

(51) Int. Cl.
*F02C 9/26*   (2006.01)
*F02C 7/232*  (2006.01)

(52) U.S. Cl.
CPC .............. *F02C 9/263* (2013.01); *F02C 7/232* (2013.01); *Y10T 137/0318* (2015.04); *Y10T 137/86517* (2015.04)

(58) Field of Classification Search
CPC ... F02C 9/263; F02C 7/232; Y10T 137/0318; Y10T 137/86517
See application file for complete search history.

(56) References Cited

U.S. PATENT DOCUMENTS

| | | |
|---|---|---|
| 3,420,055 A | 1/1969 | Lavash |
| 4,187,673 A | 2/1980 | Smith |
| 4,640,308 A | 2/1987 | Toelle |
| 4,649,700 A | 3/1987 | Gardiner et al. |
| 4,951,459 A | 8/1990 | McCarty |
| 5,315,818 A | 5/1994 | Smith |
| 2002/0078678 A1 | 6/2002 | Maillard et al. |
| 2012/0234015 A1 | 9/2012 | Reuter |

FOREIGN PATENT DOCUMENTS

| | | |
|---|---|---|
| EP | 0391610 A1 | 10/1990 |
| EP | 2428662 A2 | 3/2012 |
| EP | 2813682 | * 12/2014 |
| WO | WO02/01055 A1 | 1/2002 |

OTHER PUBLICATIONS

Extended European Search Report from EP Application Serial No. 14161270.5, dated Nov. 13, 2014, 5 pages.

* cited by examiner

*Primary Examiner* — Alfred Basichas
(74) *Attorney, Agent, or Firm* — Kinney & Lange, P.A.

(57) ABSTRACT

A method of metering fuel with a fuel valve. The method includes arranging a spool within to a sleeve along an axis, wherein the spool includes four seal lands. The sleeve includes a fuel inlet aperture, a fuel outlet aperture, and a shutoff port. A first cavity and a second cavity are defined between the spool, the sleeve, and subsets of the seal lands. The fuel inlet port and the fuel outlet port abut one such cavity. Sliding the spool along the axis results in the fuel outlet aperture extending longitudinally beyond the second seal land in the upstream direction.

20 Claims, 3 Drawing Sheets

LOW FRICTION FUEL METERING VALVE

BACKGROUND

This disclosure relates to a metering valve for a fuel metering system.

Gas turbine engines are known, and typically include a compressor that compresses a working fluid, such as air, and delivers it to a combustor. The compressed working fluid is mixed with fuel in the combustor, combusted, and the products of combustion pass downstream over turbine rotors, driving the rotors to create power.

A metering valve provides metered flow to the combustor, provides position feedback to a full authority digital engine controller (FADEC), moves in response to a FADEC command, shuts fuel flow off in response to a FADEC command and provides pressure signals to various fuel system components. Metering valves typically include a central spool surrounded by a sleeve. Apertures in the sleeve selectively allow fuel to flow in cavities defined between the sleeve and the spool. Movement of the spool in one direction relative to the sleeve causes an overlap between the sleeve apertures and the cavity and allows fuel to flow, and movement of the spool in the opposite direction relative to the sleeve may cause fuel flow to be restricted. The spool and the sleeve are kept in contact via dynamic seals and lands.

SUMMARY

A fuel metering valve includes a sleeve that has an upstream end and a downstream end. The sleeve includes ports connected to gear pump inlet pressure, gear pump inlet pressure, fuel inlet port arranged downstream of the gear pump inlet port, a fuel outlet port arranged downstream of the fuel inlet port, a gear pump inlet port arranged downstream of the fuel outlet port and fluidically connected to the gear pump inlet, and a fuel shutoff port arranged downstream of the fuel outlet port. The fuel metering valve also includes a valve spool having a stroke length along the upstream-downstream axis. The valve spool includes a first land arranged to contact the sleeve downstream of the gear pump inlet port and the shutoff port. The valve spool further includes a second land arranged such that the fuel outlet port extends farther upstream than the second land, and when the fuel metering valve is in a shutdown state the fuel outlet port of the sleeve is closed by the second seal land on the spool and the sleeve fuel shutoff port is connected to the gear pump inlet port via the downstream cavity in the spool. The valve spool further includes a third land arranged upstream of the fuel inlet port and downstream of the gear pump inlet. Finally, the valve spool includes a fourth land arranged upstream of the gear pump inlet.

A fuel metering sleeve includes a substantially cylindrical first portion having a first radius, an upstream end and a downstream end, the first portion. The first portion includes a fuel inlet port, a fuel outlet port arranged between the downstream end and the fuel inlet port, a fuel shutoff port arranged between the downstream end and the fuel outlet port, a gear pump inlet port arranged between the downstream end and the fuel shutoff port, and a gear pump inlet port arranged between the fuel inlet port and the upstream end. The second portion has a second radius and is connected to the first portion at its upstream end. The second portion includes a plurality of bypass directional control valve ports and a plurality of regulated pressure fuel inlet slots.

A method of metering fuel with a fuel valve includes arranging a spool within a sleeve along an axis. The spool includes four lands. The sleeve also includes a fuel inlet aperture, a fuel outlet aperture, and a shutoff port. The spool and the sleeve define at least two cavities. The fuel inlet and the fuel outlet abut a first cavity. The method includes slidably moving the spool along the axis with respect to the sleeve into a shutoff position. In the shutoff position, the fuel outlet aperture extends longitudinally beyond the second land in both an upstream direction and a downstream direction. In the shutdown position, the first cavity and the second cavity are fluidically connected, and the fuel shutoff port and a gear pump inlet port abut the second cavity.

DETAILED DESCRIPTION

Figure 1:
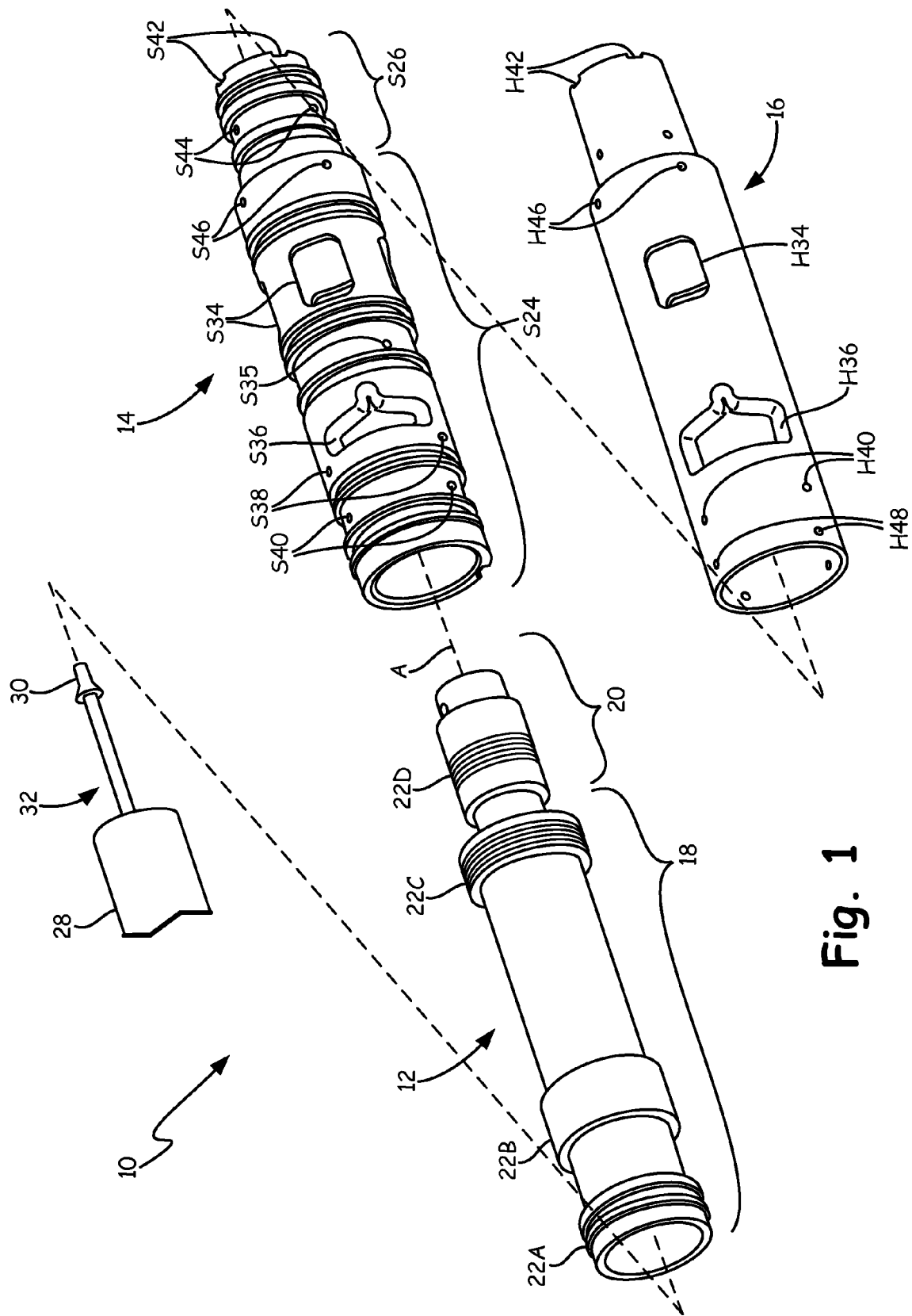
FIG. 1 is an exploded view of a housing, sensor, valve spool and a sleeve.

FIG. 1 is an exploded view of fuel metering device 10, illustrating valve spool 12, sleeve 14, and housing 16 arranged along axis A. Valve spool 12 includes first portion 18 and second portion 20. First portion 18 includes first land 22A, second land 22B, and third land 22C. Second portion 20 includes fourth land 22D. Sleeve 14 includes fuel transfer portion 24 and half-area servo portion 26. Linear Variable Differential Transformer (LVDT) 28 and probe 30 sense position of valve spool 12 within sleeve 14.

Sleeve 14 includes fuel transfer portion 24 and half-area servo portion 26. Fuel transfer portion includes fuel inlet port S34, fuel outlet port S36, fuel shutoff ports S38, first low pressure port S40, second low pressure port S46, and fuel inlet pressure sensor port S35. Half-area servo portion 26 includes regulated pressure inlets S42 and bypass directional control valve ports S44.

Fuel metering device 10 is an apparatus that may be used to route a desired quantity of fuel to each of several locations. For example, fuel metering device 10 may route fuel to a combustor, a gear pump, or a pressure sensor. Fuel metering device 10 may be used, for example, in a gas turbine engine.

Valve spool 12 is a part of fuel metering device 10. Valve spool 12 is made of two substantially cylindrical components arranged coaxially; first portion 18 and second portion 20. Often, valve spool 12 is made of a fluid-resistant, durable material, such as a hardened steel. First portion 18 has a larger radius and includes first land 22A, second land 22B, and third land 22C. Second portion 20 has a smaller radius, and is positioned adjacent to first portion 18 longitudinally. Second portion 20 also includes fourth land 22D.

Lands 22A-22D are regions of valve spool 12 with enlarged radii. Some of lands 22A-22D may include dynamic seals. In the embodiment shown in FIG. 1, land 22A has a dynamic seal. In alternative embodiments, additional lands and/or seals may be present along first portion 18 and/or second portion 20. Further, any subset of lands 22A-22D or any other land included in an alternative embodiment may be a dynamic seal.

Sleeve 14 is a second part of fuel metering device 10. Sleeve 14, like valve spool 12, is often made of an impermeable, durable material such as hardened steel. Sleeve 14 includes fuel transfer portion 24 and half-area servo portion 26. Each of fuel transfer portion 24 and half-area servo portion 26 are substantially cylindrical. Fuel transfer portion 24 has a larger radius than half-area servo portion 26. Fuel transfer portion 24 is arranged adjacent to half-area servo portion 26 longitudinally along axis A. Each of fuel transfer portion 24 and half-area servo portion 26 are arranged coaxially about axis A.

Housing 16 is a third part of fuel metering device 10. Housing 16 may be connected to adjacent components. Housing 16 includes apertures H34, H36, H40, H42, H44, H46 and H48.

Valve spool 12 fits within sleeve 14 and may move along axis A with respect to sleeve 14. Modulated pressure may be applied to a portion of valve spool 12 in order to position sleeve 14 with respect to valve spool 12. Sleeve 14, which fits within housing 16, includes several apertures/ports for allowing fuel ingress or egress. Several of the ports shown in FIG. 1 are positioned on fuel transfer portion 24. Among them are fuel inlet port S34, fuel outlet port S36, fuel shutoff port S38, first low pressure port S40, and second low pressure port S46. Each of the apertures/ports in sleeve 14 corresponds to an adjacent aperture in housing 16. Thus, fuel inlet port S34 is adjacent to housing aperture H34, fuel outlet port S36 is adjacent to housing aperture H36, fuel shutoff port S38 is also adjacent to housing aperture H36, first low pressure port S40 is adjacent to housing aperture H40, and second low pressure port S46 is adjacent to housing aperture H46. Housing 16 defines a bore that contains valve spool 12 and sleeve 14, the bore having annuluses (not shown) that align with the various ports described herein in sleeve 14. Each of the annuluses each is connected to a plumbing line (not shown) that is capable of carrying fuel to other portions of housing 14 as needed.

Fuel inlet port S34 allows fuel from a fuel source (not shown) to enter sleeve 14. Fuel outlet port S36 allows fuel to exit sleeve 14 and be routed toward a combustor or engine (not shown). Such egress is only possible when fuel outlet port S36 is at least partially unobstructed. In some embodiments and operating modes, a portion of valve spool 12, such as second land 22B, may obstruct fuel outlet port S36, preventing fuel from exiting sleeve 14. Often, fuel outlet port S36 will be partially blocked, restricting but not entirely preventing fuel egress from sleeve 14. Fuel outlet port S36 is shaped in order to generate a desired fuel egress profile with respect to the position of valve spool 12.

Fuel shutoff ports S38 are apertures in sleeve 14. Fuel shutoff ports S38 may be used to detect when valve spool 12 is in a position where engine shutdown is advisable or feasible. When such event occurs, fuel shutoff ports S38 may be fluidically connected to fuel outlet port S40, as will be described in more detail with respect to FIGS. 2A-2B. Thus, a pressure signal can be sent to a valve (not shown) via fuel shutoff ports S38 in order to cause a fuel shutdown condition.

Gear pump ports 40 are apertures in sleeve 14 as well. Gear pump ports 40 are fluidically connected to the inlet of a gear pump (not shown) such that the pressure of fluid at gear pump ports 40 approximates the pressure at the inlet of the gear pump. In a shutdown condition, as with fuel shutoff ports S38, gear pump ports 40 may be fluidically connected to fuel outlet port S36.

Gear pump inlets S46 are connected to the inlet of a gear pump (not shown). Thus, gear pump inlets are fluidically connected to gear pump ports 40. Accordingly, the pressure of fluid in gear pump inlets S46 will approximate that of the fluid in gear pump ports 40.

Other ports shown in FIG. 1 are located at half-area servo portion 26. In particular, regulated pressure inlets S42 and bypass directional control valve ports S44 are located at half-area servo portion 26. Regulated pressure inlets S42 are adjacent to housing apertures H42 and bypass directional control valve ports S44 are adjacent to housing apertures H44.

Regulated pressure inlets S42 are inlets that allows for ingress of fuel from a regulated pressure fuel source (not shown) to the interior of sleeve 14.

Bypass directional control valve ports S44 are outlets through which fuel may pass on its way to a directional control system (not shown). Bypass directional control valve ports S44 may also be partially or completely obstructed by elements of valve spool 12, such as fourth land 22D, depending on the position of valve spool 12 with respect to sleeve 14. In the event that bypass directional control valve port S44 is unobstructed, fuel at a pressure determined by regulated fuel source (not shown) may be routed to the directional control system (not shown). However, by changing the position of valve spool 12, fuel flow through bypass directional control valve port S44 may be restricted or cut off entirely.

Valve spool 12 is substantially encapsulated by sleeve 14 to form fuel metering device 10. Substantial encapsulation means that valve spool 12 touches sleeve at least at lands 22A-22D. Valve spool 12 is slidably movable within sleeve 14. The radii of first portion 18 and fuel transfer portion 24 are compatible, such that first portion 18 fits within fuel transfer portion 24. Likewise, the radii of second portion 20 and half-area servo portion 26 are compatible, such that second portion 20 fits within half-area servo portion 26. However, first portion 18 does not fit within half-area servo portion 26. Thus, the movement of valve spool 12 is limited within sleeve 14, in that first portion 18 may not move as far as half-area servo portion 26.

Modulated pressure may enter the metering valve 10 through housing 16 via modulated pressure port H48, located downstream of spool land 22A. Fuel at a desired pressure is routed to modulated pressure port H48 by the Engine Electronic Control. Locating low pressure port S40 just upstream modulated pressure ports H48 results in a lower pressure drop across the dynamic seal located at land 22A, thus reduced frictional sealing load on metering valve 10.

Fuel may flow in a cavity defined between valve spool 12 and sleeve 14. Often, fuel flow is restricted such that fuel between first portion 18 and fuel transfer portion 24 may not be routed to the area between second portion 20 and half-area servo portion 26. Fuel flow within fuel metering device 10 may cause a pressure differential across certain components, including land 22A.

Figure 2A:
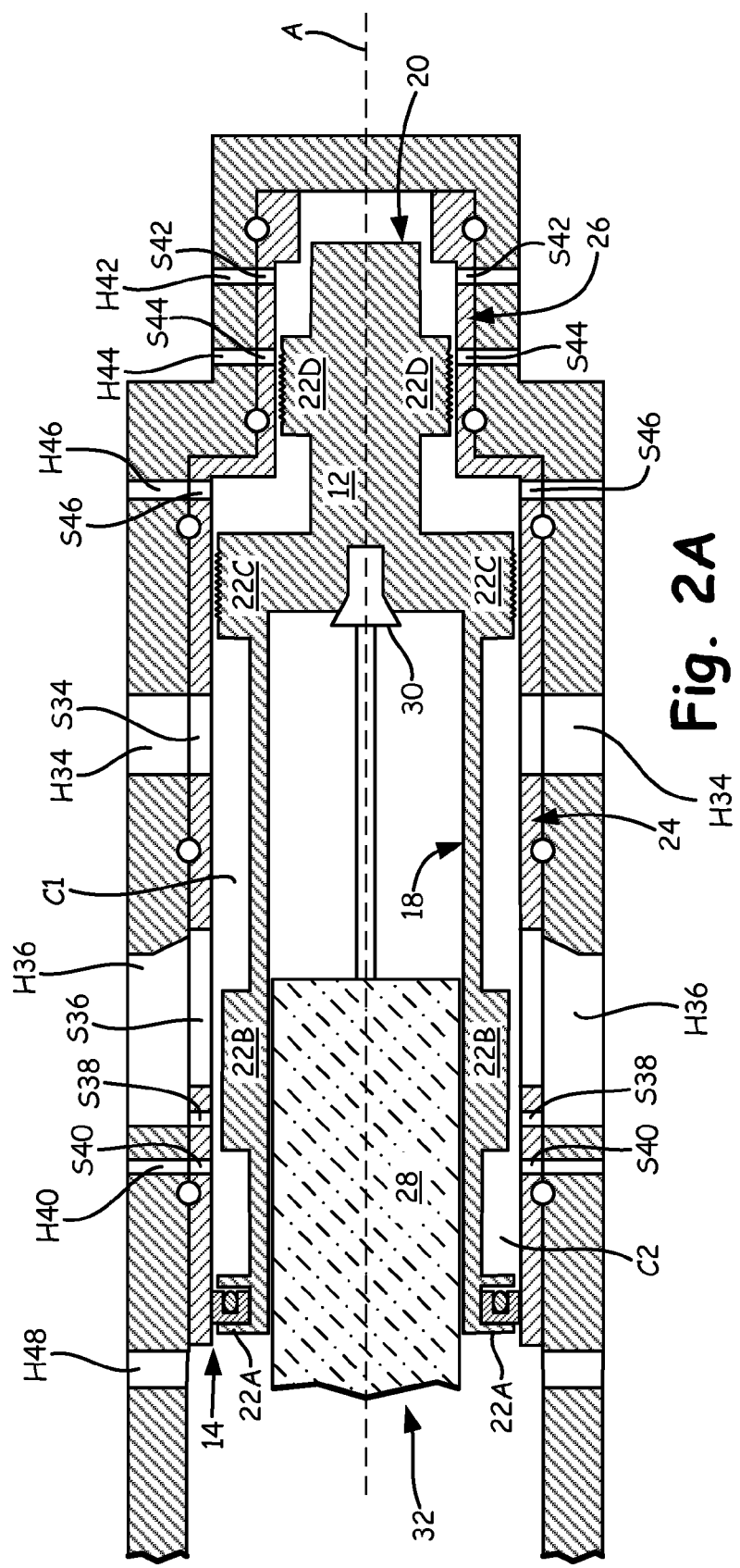
FIG. 2A is a cross-sectional view of a fuel metering device in a non-shutdown position.

FIG. 2A is a cross-sectional view of fuel metering device 10 in a state where it is not ready for shutdown. Such states may include a normal operating state, where fuel is routed to a combustor and a pressure gradient is maintained across first land 22A. FIG. 2A includes valve spool 12, sleeve 14, and housing 16, as well as the sub-components thereof previously described with respect to FIG. 1. FIG. 2A also illustrates the placement of LVDT 28, and LVDT probe 30. FIG. 2A also shows the position of fuel inlet port S34, fuel outlet port S36, fuel shutoff port S38, and first low pressure port S40 in fuel transfer portion 24. Furthermore, FIG. 2A shows the position of regulated pressure inlets S42 and bypass directional control valve ports S44 in half-area servo portion 26.

Fuel inlet port S34, fuel outlet port S36, fuel shutoff port S38, first low pressure port S40, and gear pump inlets S46 are arranged along fuel transfer portion 24. Fuel inlet port S34 is an aperture in sleeve 14 that allows for ingress of fuel to a first cavity C1 defined between valve spool 12, including second land 22B and third land 22C, and sleeve 14. Similarly, fuel outlet port S36 is an aperture in sleeve 14 that allows for egress of fuel from the first cavity C1. Fuel outlet port S36 may be, for example, a port that allows egress of the fuel towards a combustor in a gas turbine engine.

FIG. 2A also illustrates regulated pressure inlets S42 and bypass directional control valve ports S44. Each of regulated pressure inlets S42 and bypass directional control valve ports S44 are apertures formed in half-area servo portion 26 of sleeve 14.

LVDT 28 is a device that may be used to determine the position of LVDT probe 30. LVDT sensor 32 is a sensor that is configured to interface with an interior portion of valve spool 12. LVDT probe 30 is attached to valve spool 12, and LVDT 28 is attached to housing 16. Thus, as valve spool 12 moves with respect to sleeve 14, LVDT probe 30 moves with respect to LVDT 28. LVDT 28 is capable of sensing such movement and transmitting a signal with such movement information.

Housing 16 is a containment device used to hold sleeve 14. Housing 16 contains apertures H34, H36, H40, H42, H44, and H46 in order to transfer fuel towards or away from sleeve 14. These apertures are located in positions complementary to corresponding apertures in sleeve 14, including fuel inlet port S34, fuel outlet port S36, fuel shutoff port S38, first low pressure port S40, regulated pressure inlets S42, bypass directional control valve ports S44, and second low pressure port S46, respectively.

Housing 16 is directly connected to sleeve 14, such that sleeve 14 may not move relative to housing 16. Valve spool 12 is connected to sleeve 14 via lands 22A-22D, but is slidably movable with respect to sleeve 14.

FIG. 2A illustrates the relative positions of inlets and outlets along sleeve 14. In particular, fuel inlet port S34 is arranged in fuel transfer portion 24 of sleeve 14. The positioning of fuel inlet port S34 between second land 22B and third land 22C aligns fuel inlet port S34 with the first cavity C1 between valve spool 12, including second land 22B and third land 22C, and sleeve 14. Similarly, the positioning of fuel outlet port S36 such that it overlaps with a portion of second land 22B aligns a portion of fuel outlet port S36 with the first cavity C1.

In general, fuel pressure within sleeve 14 is highest at fuel inlet port S34. Accordingly, fuel pressure within fuel transfer portion 24 is often greater than fuel pressure within half-area servo portion 26. However, during shutdown, pressure is roughly equilibrated by routing fuel from fuel outlet port S36 to first low pressure port S40 and on to second low pressure port S46. Thus, positioning of fuel outlet port S36, fuel shutoff ports S38, and gear pump ports 40 on the fuel transfer portion 24 results in a reduced pressure drop across land 22A. Reduced pressure drop results in less seal friction, reduced valve hysteresis and greater control over metered flow delivered to the engine or other downstream component.

Figure 2B:
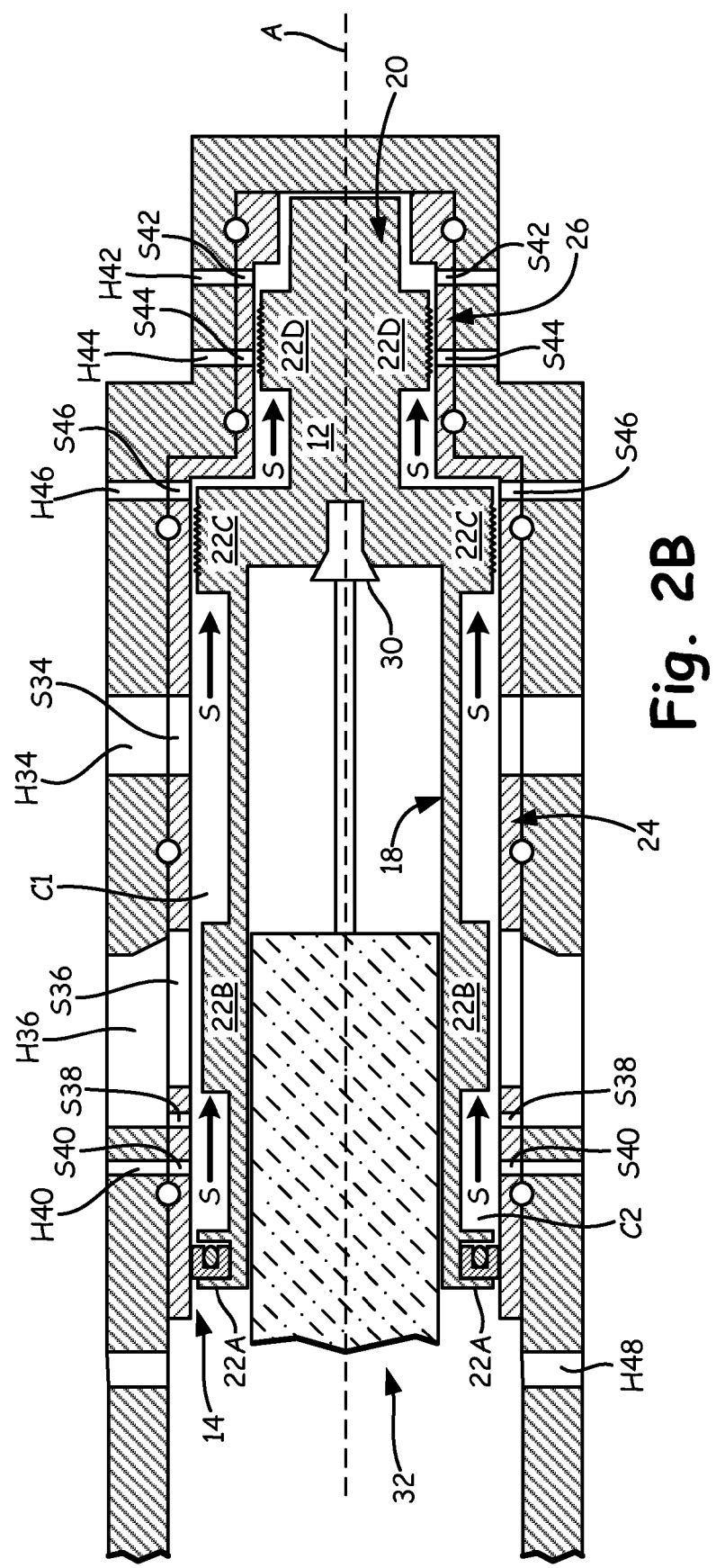
FIG. 2B is a cross-sectional view of the fuel metering device in a shutdown position.

FIG. 2B is a simplified cross-sectional view of fuel metering device 10 showing valve spool 12 and sleeve 14 arranged about axis A. As shown in FIG. 2B, fuel metering device 10 is in shutdown state. Valve spool 12 has a stroke S with respect to sleeve 14, which is the distance longitudinally along axis A that valve spool 12 has freedom to move. Valve spool 12 includes first portion 18 and second portion 20. First portion 18 includes first land 22A, second land 22B, and third land 22C, and second portion 20 includes fourth land 22D. Sleeve 14 includes fuel transfer portion 24 and half-area servo portion 26. Fuel transfer portion 24 includes fuel inlet port S34, fuel outlet port S36, fuel shutoff port S38, and gear pump 40. Half-area servo portion 26 includes regulated pressure inlets S42 and bypass directional control valve ports S44.

First portion 18 of valve spool 12 is circumscribed by fuel transfer portion 24 of sleeve 14. Similarly, second portion 20 of valve spool 12 is circumscribed by half-area servo portion 26. As valve spool 12 moves along stroke S, some or all of first portion 18 of valve spool 12 may not be longitudinally aligned with fuel transfer portion 24, and some or all of second portion 20 may not be longitudinally aligned with half-area servo portion 26. However, first portion 18 is still circumscribed by fuel transfer portion 24 in that first portion 18 is slidably movable along the radially inner side of fuel transfer portion 24. Likewise, second portion 20 is circumscribed by half-area servo portion 26 in that second portion 20 is slidably movable along the radially inner side of half-area servo portion 26.

In some operating states, such as shutdown state as shown in FIG. 2B, second land 22B may cover fuel outlet port S36. Also in this position, from fuel outlet 38 (connected to 36 within housing 16), the fuel will pass through the longitudinally downstream gap into a second cavity C2 defined by valve spool 12 (including first land 22A and second land 22B) and sleeve 14. From the second cavity C2, fuel may be routed to first low pressure port S40. Fuel from first low pressure port S40 is in fluid contact with second low pressure port S46. Thus a pressure signal can be sent to a valve (not shown) via fuel shutoff ports S38 in order to cause a fuel shutdown condition.

As valve spool 12 moves along stroke S, fuel outlet ports 36 are gradually restricted by second land 22B. Fuel entering the first cavity C1 defined by valve spool 12 and sleeve 14 will pass through fuel inlet port S34, and thence through first cavity C1 and exit through fuel outlet port S36. When valve spool 12 is at the extreme rightward end of stroke S as shown in FIG. 2B, minimal fuel is being routed from the cavity C1 defined by valve spool 12 and sleeve 14 to fuel outlet port S36. At the same time, fuel from fuel outlet port S36 is ported to first low pressure port S40 by flowing past the downstream edge of second land 22B from fuel outlet port S36. Fuel flow to bypass direction control valve ports 44 is also regulated by the position of valve spool 12 relative to sleeve 14.

At the other extreme of stroke S, as previously described with respect to FIG. 2A, both fuel inlet port S34 and fuel outlet port S36 are unobstructed by lands 22. Thus, fuel flows relatively unimpeded through fuel metering device 10. Thus, fuel flow to a downstream combustor or engine (not shown) is maximized.

Additional ports may be aligned with other cavities defined by valve spool 12 and sleeve 14. For example, fuel shutoff port S38 and first low pressure port S40 may be in contact with a second cavity C2 defined by sleeve 14 and valve spool 12, including first land 22A and second land 22B.

Fuel shutoff port S38 and gear pump port S40 are also apertures formed in fuel transfer portion 24 of sleeve 14 to allow egress of fuel from second cavity C2, which is defined by valve spool 12 (including first seal land 22A and second seal land 22B) and sleeve 14. Specifically, valve spool 12 may be placed into a shutdown position relative to sleeve 14, as shown in FIG. 2B. In shutdown position, second seal land 22B is arranged adjacent to fuel outlet port S36 to restrict fuel flow from cavity C1 to the fuel outlet port S36. Further, fuel may pass from fuel outlet port S36 to adjacent housing apertures H36. This fuel is then routed through the fuel shutoff port S38 to a second cavity C2 defined by the body of valve spool 12 (including first seal land 22A and second seal land 22B) and sleeve 14. From this second cavity C2, fuel may be routed from the fuel shutoff port S38 to low pressure port (also referred to throughout as gear pump port S40).

Gear pump inlet S46 is positioned opposite third seal land 22C from fuel inlet port S34. When fuel metering device 10 enters a shutdown state, fuel is routed from fuel outlet port S36, to gear pump port S40. Gear pump port S40 and gear pump inlet S46 are each fluidically connected to the input of a gear pump (not shown). Thus, in a shutdown state, the pressure differential across third seal land 22C is minimized.

An important function of a fuel metering valve for a complex system such as a gas turbine engine is the ability to provide accurate quantities of fuel or signals to other sources. As such, LVDT 28 and LVDT probe 30 are valuable to provide position information regarding valve spool 12. Furthermore, the relative positions of fuel inlet port S34, fuel outlet port S36, fuel shutoff port S38, and gear pump port S40 on fuel transfer portion 24, are beneficial in providing reduced valve hysteresis due to a small pressure drop across first seal land 22A.

By positioning gear pump port S40 and fuel shutoff port S38 in fuel transfer portion 24 and routing fuel from gear pump port S40 to gear pump inlet S46 when fuel metering valve is in a shutdown state, fuel pressure is equilibrated during shutdown. The pressure of the fuel in the cavity between fuel transfer portion 24 and valve spool 12 is typically less than the pressure of the fuel in the cavity between sensor fuel portion 26 and valve spool 12. Thus, by positioning fuel shutoff port S38 and gear pump port S40 on the fuel transfer portion 24 side of sleeve 14, the pressure drop across third seal land 22C is reduced. This reduced pressure difference results in less seal friction, and thus reduced valve hysteresis and greater accuracy in metered fuel flow delivered to a combustor or other engine downstream of fuel outlet port S36.

In all conditions other than shutdown, fuel may not be routed around second seal land 22B to fuel shutoff sensor 38 and/or gear pump outlet 40. Thus, in all other conditions than shutdown along stroke S, the fuel incident on fuel shutoff port S38 is not fluidically connected to the fuel at fuel inlet port S34. Likewise, at all other conditions other than shutdown along stroke S, the fuel incident at gear pump port S40 is not fluidically connected to the fuel at fuel inlet port S34. Thus, along the majority of stroke S, a pressure differential is maintained across second seal land 22B, and at shutdown the pressure differential is minimized or eliminated.

Detailed Listing of Potential Embodiments

A fuel metering valve includes a sleeve having an upstream end and a downstream end. The sleeve includes a gear pump inlet port, fuel inlet port arranged downstream of the fuel inlet port, a fuel outlet port arranged downstream of the fuel inlet port, a gear pump inlet port arranged downstream of the fuel outlet port and fluidically connected to the gear pump inlet, and a fuel shutoff port arranged downstream of the fuel outlet port. A valve spool has a stroke length along the upstream-downstream axis. The valve spool includes a first land arranged to contact the sleeve downstream of the gear pump inlet port and the shutoff port, a second land arranged such that the fuel outlet port extends farther upstream than the second land, and when the fuel metering valve is in a shutdown state the second seal land extends farther in both the upstream and downstream directions than the fuel outlet port to minimize the fuel flow from upstream of the second seal land to downstream of the second seal land via the gear pump inlet port and the shutoff port, a third land arranged upstream of the fuel inlet port and downstream of the gear pump inlet, and a fourth land arranged upstream of the gear pump inlet.

The first land of the metering valve may be a dynamic seal. The shutdown mode may occur at one extreme of the valve spool stroke. A first cavity may be defined by the sleeve and the valve spool, including the second land and the first land, and a second cavity may be defined by the sleeve and the valve spool, including the first land and the second land. The fuel metering valve may also include a fuel pathway along the fuel inlet port, the first cavity, the fuel outlet port, and the second cavity, wherein the gear pump inlet port and the fuel shutoff port abut the second cavity. The fuel pathway may only open during an engine shutdown condition. The fuel pathway may also include the gear pump inlet port. The fuel pathway may be configured to reduce a pressure differential across the first land.

A fuel metering sleeve includes a substantially cylindrical first portion having a first radius, an upstream end and a downstream end. The first portion includes a fuel inlet port, a fuel outlet port arranged between the downstream end and the fuel inlet port, a fuel shutoff port arranged between the downstream end and the fuel outlet port, a gear pump inlet port arranged between the downstream end and the fuel shutoff port, and a gear pump inlet port arranged between the fuel inlet port and the upstream end. The fuel metering valve also includes a substantially cylindrical second portion having a second radius and connected to the first portion at the upstream end, the second portion having a plurality of bypass directional control valve ports and a plurality of regulated pressure fuel inlet slots.

The second radius may be smaller than the first radius. The fuel metering sleeve may also include a land capable of interfacing with a dynamic seal. The land may be positioned on the first portion, between the upstream end and the gear pump inlet port. The fuel metering sleeve may also include a second fuel metering outlet. The second fuel metering outlet may be an aperture having a non-rectangular shape.

A method of metering fuel with a fuel valve having a valve spool slidably arranged within a sleeve along an axis, the spool comprising first, second, third, and fourth lands and the sleeve comprising a fuel inlet aperture, a fuel outlet aperture, and a shutoff port, includes the following steps: slidably moving the spool along the axis with respect to the sleeve into a shutoff position, such that the fuel inlet aperture abuts a first cavity defined by the third land, the second land, the valve spool, and the sleeve; the fuel outlet aperture extends longitudinally beyond the second land in an upstream direction along the axis; and the fuel shutoff port and the gear pump inlet port abut a cavity defined between the spool, the first land, the second land, and the sleeve.

The method may also include slidably moving the valve spool such that the second land blocks fuel from being routed to the second cavity, and routing fuel through the fuel inlet aperture, through the first cavity, and then through the fuel outlet port. The method may also include combusting the routed fuel. The method may also include routing fuel from the fuel inlet port to the fuel outlet port to the second cavity to the gear pump inlet port to the gear pump inlet port. Routing fuel from the fuel from the fuel inlet port to the gear pump inlet port may cause a reduction in a pressure differential across the third land. The fuel being routed to the shutoff port may cause the engine to enter a shutdown-ready state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel metering valve comprising:
a sleeve having an upstream end and a downstream end, the sleeve comprising:
a gear pump inlet port;
a fuel inlet port arranged downstream of the gear pump inlet port;
a fuel outlet port arranged downstream of the fuel inlet port;
a low pressure port arranged downstream of the fuel outlet port and fluidically connected to the gear pump inlet; and
a fuel shutoff port arranged downstream of the fuel outlet port;
a valve spool having a stroke length along the upstream-downstream axis, the valve spool comprising:
a first land arranged to contact the sleeve downstream of the gear pump inlet port and the shutoff port;
a second land arranged such that the fuel outlet port extends farther upstream than the second land, and when the fuel metering valve is in a shutdown state the second seal land extends farther in both the upstream and downstream directions than the fuel outlet port to minimize the fuel flow from upstream of the second seal land to downstream of the second seal land via the gear pump inlet port and the shutoff port;
a third land arranged upstream of the fuel inlet port and downstream of the gear pump inlet port; and
a fourth land arranged upstream of the gear pump inlet.

2. The fuel metering valve of claim 1, wherein the first land is a dynamic seal.

3. The fuel metering valve of claim 1, wherein the shutdown mode occurs at one extreme of the valve spool stroke.

4. The fuel metering valve of claim 1, wherein:
a first cavity is defined by the sleeve and the valve spool, including the second land and the third land; and
a second cavity is defined by the sleeve and the valve spool, including the first land and the second land.

5. The fuel metering valve of claim 4, and further comprising a fuel pathway, the fuel pathway comprising:
the fuel inlet port;
the first cavity;
the fuel outlet port; and
the second cavity, wherein the gear pump inlet port and the fuel shutoff port abut the second cavity.

6. The fuel metering valve of claim 5, wherein the fuel pathway is only opened during an engine shutdown condition.

7. The fuel metering valve of claim 6, wherein the fuel pathway further comprises the gear pump inlet port.

8. The fuel metering valve of claim 7, wherein the fuel pathway is configured to reduce a pressure differential across the first land.

9. A fuel metering sleeve comprising:
a substantially cylindrical first portion having a first radius, an upstream end and a downstream end, the first portion comprising:
a fuel inlet port;
a fuel outlet port arranged between the downstream end and the fuel inlet port;
a fuel shutoff port arranged between the downstream end and the fuel outlet port;
a low pressure port arranged between the downstream end and the fuel shutoff port; and;
a gear pump inlet port arranged between the fuel inlet port and the upstream end; and
a substantially cylindrical second portion having a second radius and connected to the first portion at the upstream end, the second portion comprising:
a plurality of bypass directional control valve ports; and
a plurality of regulated pressure fuel inlet slots.

10. The fuel metering sleeve of claim 9, wherein the second radius is smaller than the first radius.

11. The fuel metering sleeve of claim 9, and further comprising a land capable of interfacing with a dynamic seal.

12. The fuel metering sleeve of claim 11, wherein the land is positioned on the first portion, between the upstream end and the gear pump inlet port.

13. The fuel metering sleeve of claim 9, and further comprising a second fuel outlet.

14. The fuel metering valve of claim 13, wherein the second fuel outlet is an aperture having a non-rectangular shape.

15. A method of metering fuel with a fuel valve having a valve spool slidably arranged within a sleeve along an axis, the spool comprising first, second, third, and fourth lands and the sleeve comprising a fuel inlet aperture, a fuel outlet aperture, and a shutoff port, the method comprising:
slidably moving the spool along the axis with respect to the sleeve into a shutoff position, such that:
the fuel inlet aperture abuts a first cavity defined by the third land, the second land, the valve spool, and the sleeve;
the fuel outlet aperture extends longitudinally beyond the second land in an upstream direction along the axis; and
the fuel shutoff port and a gear pump inlet port abut a cavity defined between the spool, the first land, the second land, and the sleeve.

16. The method of claim 15, and further comprising:
slidably moving the valve spool such that the second land blocks fuel from being routed to the second cavity; and
routing fuel through the fuel inlet aperture, through the first cavity, and then through the fuel outlet port.

17. The method of claim 16, and further comprising combusting the routed fuel.

18. The method of claim 15, and further comprising routing fuel from the fuel inlet aperture to the low pressure port.

19. The method of claim 18, wherein routing fuel from the fuel from the fuel inlet port to the gear pump inlet port causes a reduction in a pressure differential across the third land.

20. The method of claim 15, wherein fuel being routed to the shutoff port causes the engine to enter a shutdown-ready state.

* * * * *